April 12, 1938.  L. R. ROBINSON  2,114,061
SHELTER EQUIPMENT AND METHOD OF ASSEMBLING THE SAME
Filed June 18, 1936  4 Sheets—Sheet 1
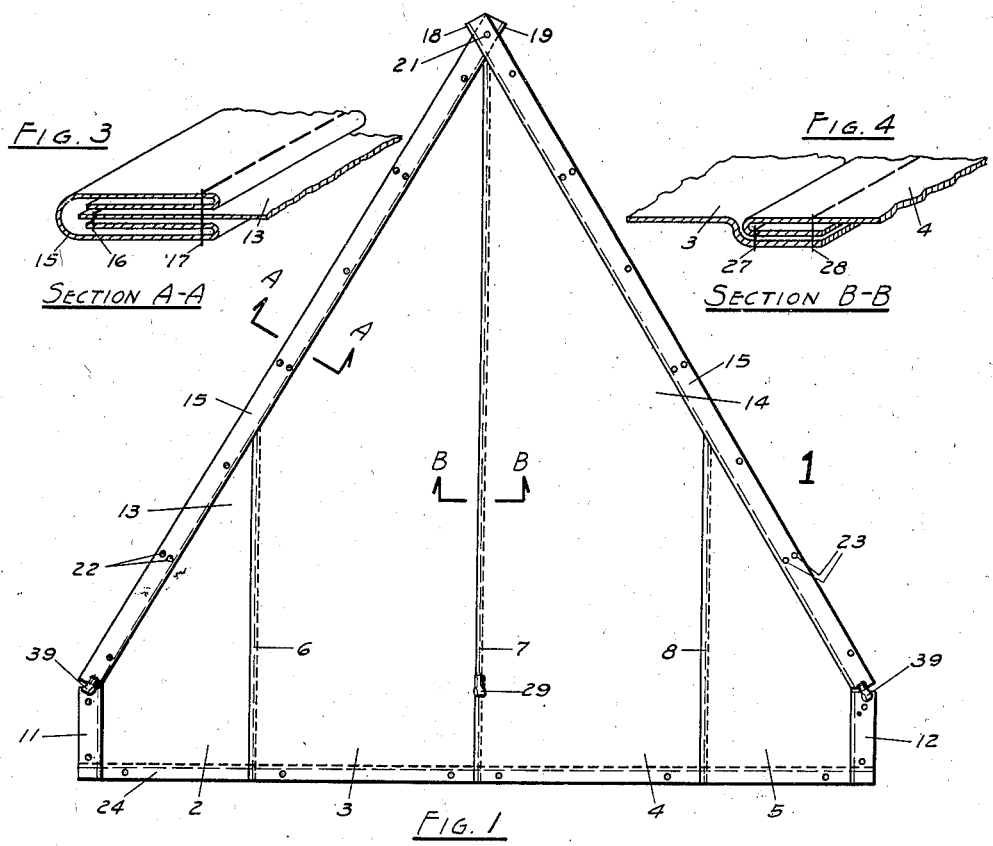
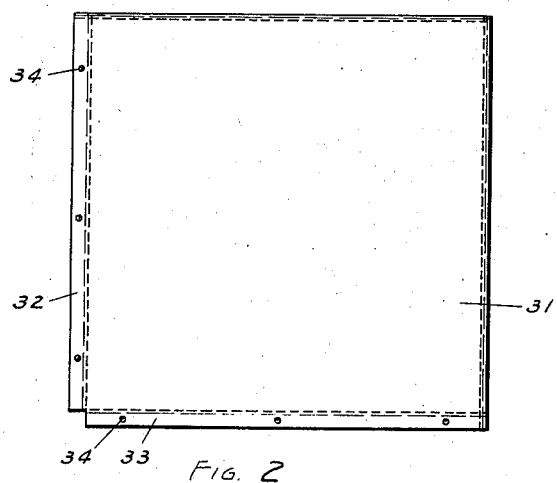
LAWRENCE R. ROBINSON
INVENTOR.
BY Saywell & Wesseler,
ATTORNEYS.

April 12, 1938.  L. R. ROBINSON  2,114,061
SHELTER EQUIPMENT AND METHOD OF ASSEMBLING THE SAME
Filed June 18, 1936  4 Sheets-Sheet 2
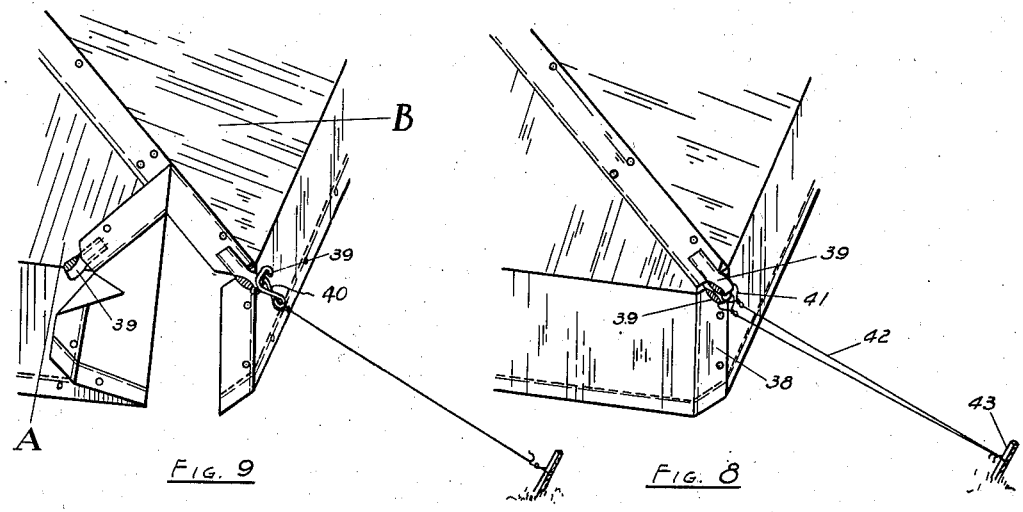
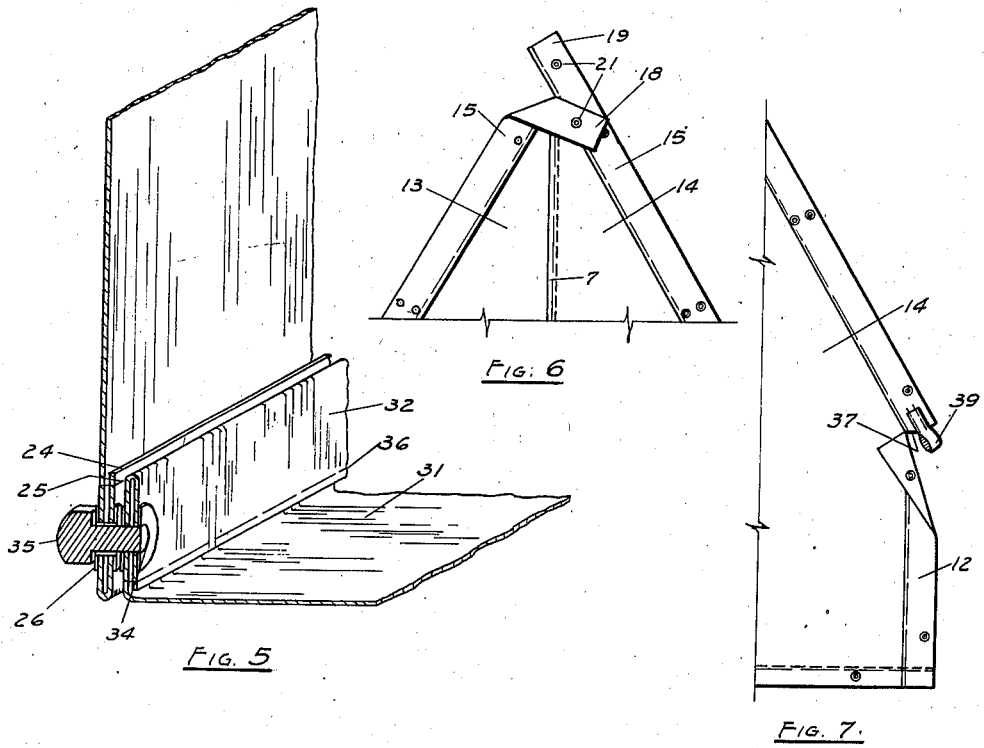
INVENTOR.
LAWRENCE R. ROBINSON.
BY Saywell & Tvesseler,
ATTORNEYS.

April 12, 1938. L. R. ROBINSON 2,114,061
SHELTER EQUIPMENT AND METHOD OF ASSEMBLING THE SAME
Filed June 18, 1936 4 Sheets-Sheet 3

SECTION C-C

INVENTOR.
LAWRENCE R. ROBINSON
BY Saywell & Wesseler,
ATTORNEYS.

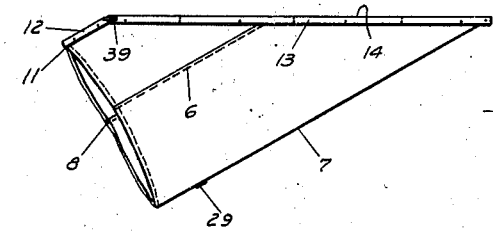
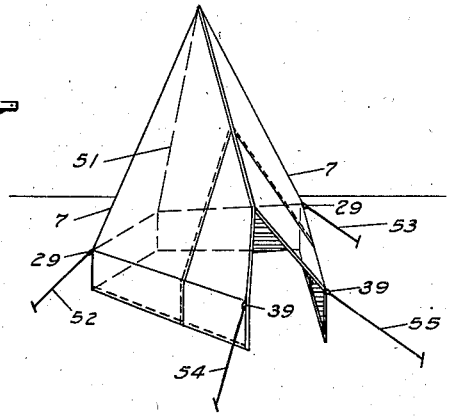
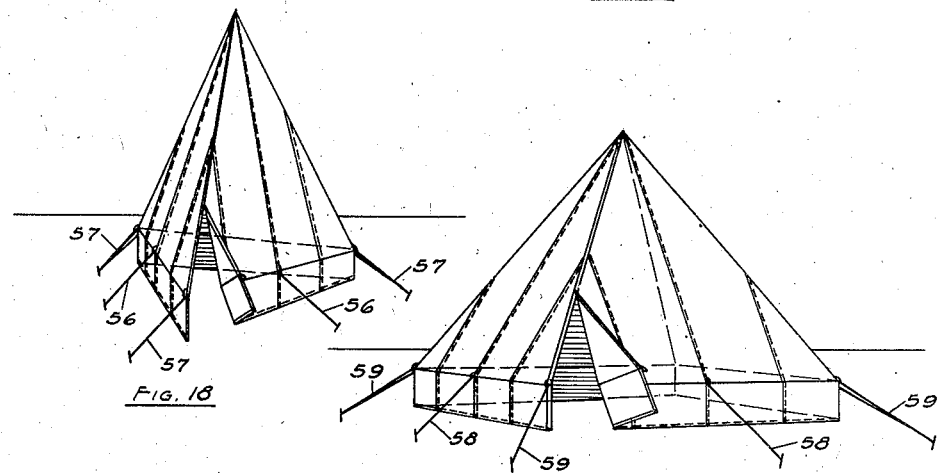
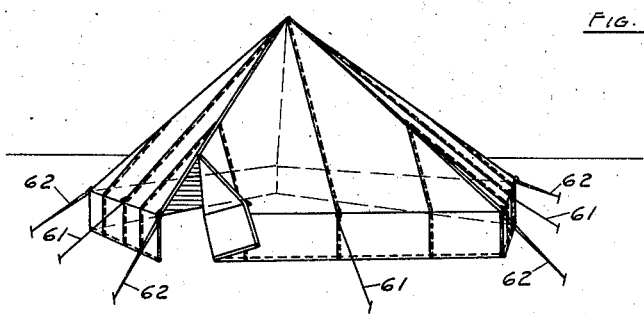
Lawrence R. Robinson.
INVENTOR.

Patented Apr. 12, 1938

2,114,061

UNITED STATES PATENT OFFICE 2,114,061

SHELTER EQUIPMENT AND METHOD OF ASSEMBLING THE SAME

Lawrence R. Robinson, Cleveland, Ohio

Application June 18, 1936, Serial No. 85,931

14 Claims. (Cl. 135—1)

This invention, as indicated, relates to shelter equipment and method of assembling the same. More particularly, it comprises sections of flexible material, such as canvas, said sections being of uniform design and adapted to be closed or partially closed and used as a single section, or in multiple sections varying from two to five or more in accordance with the requirements of the users. The invention also comprises the method of utilizing the sections of flexible material to form a sleeping bag, windbreak, or multiple section tent. The equipment is particularly adapted for use by Boy Scouts, and one of the staffs forming part of Boy Scout equipment may be utilized as a center pole for the tent structure. The invention also comprises a floor section adapted to be used alone or in conjunction with other floor sections and united with the lower marginal portions of the tent sections to provide a fully enclosed structure within which the users may be sheltered against severe weather conditions as well as protected against the intrusion of animals and insects. The tent sections, when utilized by groups of persons for camping equipment, may be placed in the equipment of each individual as a single section, and the structure erected when a camp site is selected may be varied in accordance with the special requirements of the group as to the size of the structure.

Heretofore it has been proposed to provide sectional tents wherein the individual sections were carried by individuals of the group using the same, and to assemble the same in various ways to serve as shelters. Such structures, however, have involved difficulties in fabrication which would make them suitable for easy transport, and such units also have been of a character not to lend themselves readily to combination in structures of multiple sections over a wide range. Such structures likewise have presented difficulties in assembling the sections in weather-tight relation and, in many instances, have failed to provide a satisfactory weather-tight connection at the point of central support, and this has rendered the shelters uncomfortable for the users of the equipment.

The principal object of the present invention is to provide readily transportable shelter equipment which may be utilized in one or more units and provide adequate protection from the weather for those using the same.

Another object of the invention is to provide a section formed of canvas or the like and provided with means for supporting and guying the same and uniting the margins with other sections to provide a shelter formed of multiple units which may vary in number in accordance with the requirements of the users.

Another object of the invention is to provide a section for a shelter tent having a specially constructed top which is adapted to be placed in weather-tight relation with companion sections and form a perfect seal at the top of the center pole.

Another object of the invention is to provide a tent adapted to be formed of a plurality of sections, each securely anchored against displacement and affording at the point of union with companion sections an area which may be utilized to provide an opening for entrance or ventilation, such points of opening being readily changed in accordance with changing conditions such as shifting of the wind or the like.

Another object of the invention comprises the provision of reinforced seam lines and separable fasteners and loops for connection with guy ropes so positioned and standardized as to cooperate with companion sections in forming a multiple section tent of different sizes to accommodate various numbers of users.

Other and further objects of the invention will appear in the course of the following description.

To the accomplishment of the foregoing and related ends, said invention, then, consists of the means and method hereinafter fully described and particularly pointed out in the claims, the annexed drawings and the following description setting forth in detail certain means and methods embodying the invention, such disclosed means and method constituting, however, but several of various forms in which the principle of the invention may be used.

In said annexed drawings:

Figure 1 is a plan view of a single section adapted to form a sleeping bag or a wall section of a shelter tent embodying the principles of the invention;

Figure 2 is a plan view of a floor section of a shelter tent;

Figure 3 is a fragmentary perspective view, taken along the line A—A shown in Figure 1, looking in the direction of the arrows, showing the manner of reinforcing the marginal portions of the structure shown in Figure 1;

Figure 4 is a view similar to Figure 3, taken along the line B—B, shown in Figure 1, illustrating the method of reinforcing the central seam of said structure;

Figure 5 is a fragmentary perspective view, showing the marginal seams of the wall and floor units of a tent structure and the method of uniting the same by means of separable fasteners;

Figure 6 is a fragmentary plan view of the top portion of a tent section with one of the extension tabs folded upon itself;

Figure 7 is a fragmentary plan view showing the corner construction of a tent section with individual guy rope loops and special marginal construction in connection therewith;

Figure 8 is a fragmentary perspective view showing the manner of guying and connecting the lower corner portion of two tent sections;

Figure 9 is a view similar to Figure 8, showing the manner of providing an opening at one of the corners, and showing modified guying means;

Figure 16 is a perspective view showing a single section with certain of the snap fasteners at the margin secured to provide a sleeping bag;

Figures 17, 18, 19 and 20 are perspective views showing, respectively, shelter tents formed of two, three, four and five section.

Figure 10:
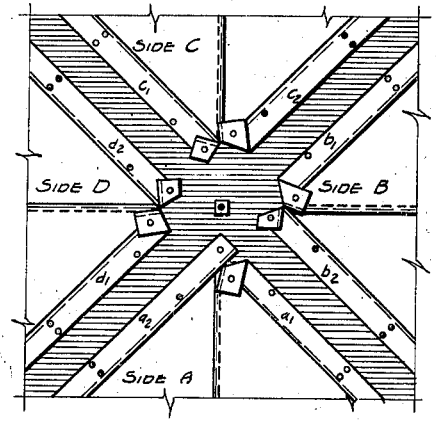
Figures 10, 11, 12, 13 and 14 are diagrammatic plan views showing progressively the manner of connecting the extension tabs of a four section tent to the pin on the center pole.

As is clearly shown in Figure 1 of the drawings, a standardized unit 1 is provided, which, when supported on a pole and suitably guyed provides a windbreak, and which, when supported on a center pole, serves as a wall section of a tent when combined with one or more companion units, or which serves as a sleeping bag when folded and united along its edges, as will be hereinafter described. The unit is preferably made of canvas or like material, and is most economically formed from a plurality of widths of such material 2, 3, 4, 5, united along their overlapping marginal edges by means of longitudinal seams 6, 7, 8. The section is roughly in the shape of an equilateral triangle, with its lower corners cut away to form shallow side portions 11, 12, parallel to the seams 6, 7, 8.

The inclined marginal portions 13, 14 of the unit 1 are provided with heavy reinforcement, preferably in the form of a canvas strip 15 folded inwardly upon itself at each edge, as shown in Figure 3, and engaged over the marginal portions 13, 14, of the unit, respectively. Lines of stitching 16, 17 serve to unite the reinforcing elements to the marginal portions of the unit. The heavy reinforcing strips 15 are extended beyond the meeting point of the marginal portions 13, 14 of the unit, and provide extension tabs 18, 19 at such point, each tab being provided with a pin engaging eyelet 21 centrally of such extension, as illustrated in detail in Figure 6.

A reinforcing strip similar to the strip 15 is applied to each of the shallow side portions 11, 12, and such reinforcing strips 15 along the side margins of the unit are provided at spaced intervals with the pin members 22 and socket members 23 of separable fasteners along opposite sides of said unit, respectively.

The lower margin 24 of the unit is turned inwardly and upwardly, as is more clearly shown in Figure 5, and secured by one or more rows of stitching 25, and is provided at spaced intervals with the socket elements 26 of separable fastener elements.

The central seam 7 of the unit is preferably made of extra width and reinforced in the manner shown in Figure 4, by folding one of the sections upon itself preliminary to forming the lines of stitches 27, 28 therethrough. The seam 7 accordingly is adapted to withstand a heavy strain and is utilized as one of the means of anchoring the tent, a loop 29 being provided on the seam adjacent its lower portion to receive a guy rope. The seam 7 forms the corner edge of a shelter tent when two units are united and supported on a center pole to form a two-section tent, as will be hereinafter described in connection with Figure 17 of the drawings.

The tent structure, whether formed of two or more sections, is preferably provided with a ground sheet or floor section 31, which is preferably of rectangular shape and provided with extension reinforced marginal edges 32, 33, provided at spaced intervals with elements of a separable fastener, such as the pin elements 34 illustrated in Figure 5, said pins preferably being of greater width in one direction and having rotatable locking end members 35 which may be turned after said pin is inserted through the socket elements 26. The marginal portions of the floor section are preferably reinforced by turning said edge portions inwardly upon themselves and securing the same by one or more rows of stitches 36.

The upper portion of the unit has already been described and is shown in detail in Figure 6. The structure of the lower side portions of the unit is illustrated in detail in Figure 7. At the point where the shallow side portions 11, 12 meet the inclined portions 13, 14, a notch 37 is provided, separating the reinforced inclined margin from the reinforced shallow side portion. This permits the free folding of the reinforced shallow side portions of adjacent units over each other, so as to form a corner closure 38 in the manner illustrated in Figure 8. The inclined reinforced side portions of the unit are provided at their lower ends, respectively, with loops 39 adapted to receive the terminal elements 41 of a guy rope 42. The guy ropes may be secured to a peg 43 in conventional manner. When adjacent units are united by means of the separable fasteners, the loops 39 on adjacent sections will be positioned one above the other, as is shown in Figure 8, and will thus maintain a longitudinal stress over the full length of such meeting points of said sections. The loops may be held by means of separate guy ropes, or through the use of a double hook 40 or the like, upon a single guy rope, each of the loops may be individually connected or disconnected from the adjacent guy ropes without disturbing the adjustment of the companion guy rope. Thus, as is shown in Figure 9, the engagement of the lower loop 39 on the tent section B is maintained, whereas the engagement of the loop 39 on the tent section A has been released, providing an opening in the corner of the tent at such point. This opening may be extended upwardly to any desired extent by opening the separable fasteners. The separable fasteners, it will be noted, are preferably in pairs at alternate intervals along the length of the side members so as to permit the folding back or guying at an angle of a portion of the tent structure without putting so great a strain upon the structure as to open the parts to a greater extent than desired.

As has been explained, the greatest difficulty with tent structures employing a plurality of companion sections is involved in the engagement of said sections at the top to form a weatherproof connection at such point. The present invention provides a thoroughly sealed top connection, which may be formed with a minimum of effort, and which brings about a symmetrical structure free of distortion when assembled.

Figure 11:
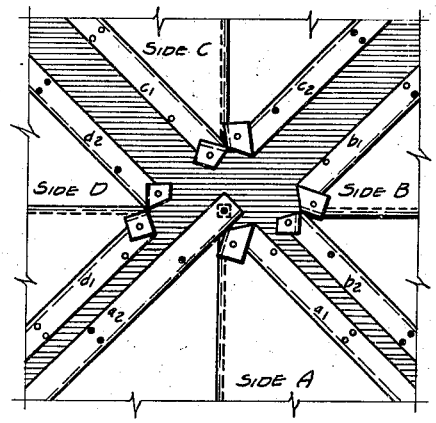
Figure 12:
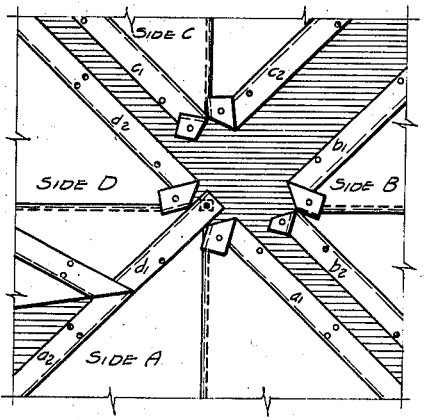
Figure 13:
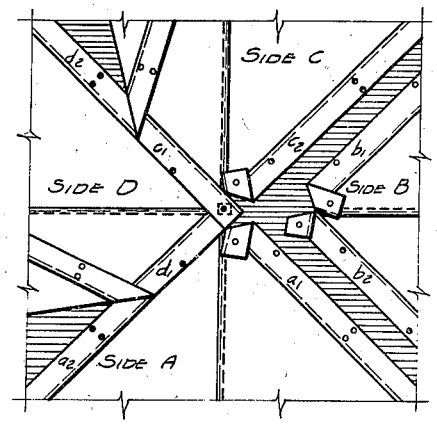
Figure 14:
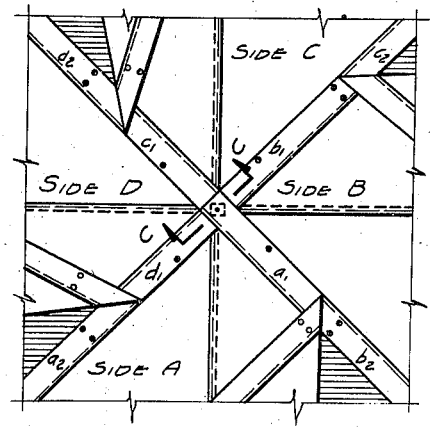
Figure 15:
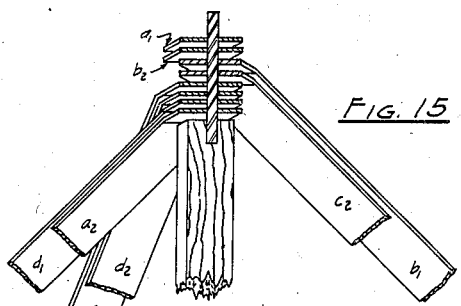
Figure 15 is a perspective view, partly in section, taken along the line C—C shown in Figure 14, looking in the direction of the arrows, and illustrating somewhat diagrammatically the interrelation of the extension tabs on the pin of the center pole.

The manner of assembling a multiple section tent is illustrated in connection with a four section tent in Figures 10 to 14. The same principles will apply with reference to a multiple section tent of a smaller or larger number of sections. In the form shown, the sections are spread out in the manner shown in Figure 10, and the eyelet in the tab at the end of the left hand reinforcing strip $a2$ of the side A is then engaged over the pin, as shown in Figure 11. The reinforcing strip $d1$ of the side D is then placed upon the strip $a2$, and the eyelet in the end of the extension tab of said strip is engaged over the pin, as shown in Figure 12. The lower ends of the strips are attached progressively to their respective guy ropes, and the separable fasteners of superposed strips may be engaged progressively. The eyelet in the extension tab of reinforcing strip $d2$ of the side D is engaged over the pin, and thereafter the eyelet in the extension tab of reinforcing strip $c1$ of the side C is engaged over the pin, as shown in Figure 13. This is followed by the engagement over the pin of the eyelet in the reinforcing strip extension tab $c2$ of the side C, and thereafter the eyelet in the extension tab of the strip $b1$ is engaged over the pin with the strip $b1$ superimposed upon the strip $c2$. The strip $b2$ of the side B is then engaged beneath the unattached strip $a1$ of the side A and the eyelet in the extension tab at the end of the strip $b2$ is engaged over the pin. The final extension tab to be engaged over the pin is the tab at the end of the reinforcing strip $a1$ of the side A, and the placing of the eyelet of this strip on the pin and the securing of the remaining guy ropes and separable fasteners completes the assembly of the tent sections. It will be noted that as shown in Figure 15, the extension tabs of the strips $a2$ and $a1$ comprise the bottom and top tabs, respectively, of the series of tabs engaged upon the pin. The overlapping of the adjacent strips is so close, and the adjacent portions of the tent sections are drawn together so perfectly and held in position by the separable fasteners, that the top joint of the structure is completely weather-proof.

The tents may be assembled very quickly in the manner just described, and likewise the taking down of the structure may be brought about with a minimum of effort, the mere pulling downwardly of the pin releasing all the tabs by a single movement.

The manner of using the units singly or in multiple relation will now be described. The single unit may be supported by a pole and the structure suitably guyed to provide a windbreak. It may also be used as a sleeping bag, in the manner shown in Figure 16, by uniting the side portions 13, 14 by means of the separable fasteners along the inclined edges and by uniting the shallow side portions by means of the separable fasteners on said respective margins.

Where a tent is to be formed of two sections, they may be united in the manner shown in Figure 17, wherein they are secured together by separable fasteners along the meeting line 51 with the loops at the rearward portion secured to a guy rope anchored to a peg in the usual manner (not shown). The side edges of the tent are formed by the central seams 7 of the respective units, which are drawn taut by means of guy ropes 52, 53, respectively, engaged through the loops 29 adjacent the lower ends of said central longitudinal seams. The loops 39 at the forward edges of the respective units are connected by guy ropes 54, 55, respectively, to spaced tent pegs which draw the lower portions of the forward edges apart to provide a combined entrance and ventilating opening at the lower part of the meeting edges of said forward edges, the upper portion being united through the securing of the separable fasteners in said respective units to each other.

A three-sided tent is formed in the manner illustrated in Figure 18, the three sides being held in substantially flat position through the positioning of the central guy ropes 56 in line with the end guy ropes 57 in the manner shown.

A four-sided tent, after having the sections assembled in the manner illustrated in Figures 10 to 14, is anchored to the ground in the manner shown in Figure 19, with the central guy ropes 58 in line with the end guy ropes 59.

A five-sided tent likewise may be assembled, in which case the parts may be united in the manner shown in Figure 20, wherein the central guy ropes 61 are preferably kept in alinement with the corner guy ropes 62.

If it is desired to give the structure a somewhat circular form, the pegs for the central guy ropes 61 may be spaced outwardly to some extent from the line of the corner guy ropes 62 and thus provide a substantially circular floor space within the structure. In most instances, however, it is desirable to maintain the separate units in a single plane in order that the lower edges thereof may hang in a substantially straight line and form points of attachment for the ground sheets or floor sections 31 heretofore described.

These floor sections within the tent structure will overlap, but such overlapping is an advantage in that it provides a double coverage of the floor over certain portions of the tent and prevents small animals and insects entering beneath the side walls. The floor sections are provided with separable fastener elements and may be readily detached and cleaned as required from time to time.

As is clearly shown in Figures 18, 19 and 20, as well as in Figure 9, a door may be provided at any corner of the structure by detaching one of the fastenings from the superposed loops 39 and turning the canvas carrying the loop so released backwardly to the desired extent by releasing one or more of the series of separable fasteners along the inclined edge of such section. Thus, an opening of considerable extent may be made to provide an entrance and exit from the structure, and other openings may be provided at any of the other corners of lesser extent to provide satisfactory ventilation. In the event of a heavy wind blowing from one direction, the opening may be changed from a point of exposure to the wind to an edge of the structure which is sheltered by the opposite walls.

The pitch angle of the tent may, of course, be changed to meet various requirements, but for most purposes a standardized unit such as has been described with substantially equal side edges and bottom edges will be found adequate for general use. The center pole should be of a length to maintain the sides in substantially a single plane with the lower edges in a straight line. For Boy Scouts the unit section should be of a size to permit the use of the staffs ordinarily carried by such groups to be used as center poles by the insertion of the pin in the end thereof to receive the extension tabs in superposed relation as heretofore described and shown in detail in Figure 15.

Where a group of persons go on a camping expedition, such as a Boy Scout unit, it will be found that they may use the unit tent section as a protecting member for their other equipment in making up their pack, and thus be relieved of an excess amount of baggage through the double use of such units. Each person in the unit may also carry the pegs and guy ropes for his section and thus with a minimum of effort a shelter may be quickly erected.

Other modes of applying the principle of my invention may be employed instead of those explained, change being made as regards the means and steps herein disclosed, provided the means stated by any of the following claims or the equivalent of such stated means be employed.

I therefore particularly point out and distinctly claim as my invention:

1. A method of assembling a multi-section tent, which comprises the steps of erecting a center pole having a connecting element at the top, connecting the upper portion of one side edge of one section to said connecting element, guying the lower portion of said edge to a point of support, thereafter connecting the adjacent side edge of a second section to said connecting element at the top of the pole and in overlapping relation to the edge of the first section, independently guying the lower portion of said side edge to a point of support in substantial alinement with the point of support of the lower end of the adjacent side edge of the first section, thereafter connecting the upper portion of the opposite side edge of said second section to said connecting element at the top of the pole, guying the lower portion of said opposite side edge to a point of support, thereafter installing progressively additional sections of said tent in the manner of said second section until the required number of sections have been connected at each side edge to said connecting element at the top of the pole and to a point of support at the lower end, respectively, thereafter connecting the opposite edge of the first-named section to the connecting element at the top of the pole and in overlapping relation to the adjacent edge of the last-installed section, and guying the lower portion of said edge to a point of support in substantial alinement with the point of support of the lower end of the last-installed section.

2. A method of assembling a multi-section tent, which comprises the steps of erecting a center pole having a connecting element at the top, connecting the upper portion of one side edge of one section to said connecting element, guying the lower portion of said edge to a point of support, thereafter connecting the adjacent side edge of a second section to said connecting element at the top of the pole and in overlapping relation to the edge of the first section, independently guying the lower portion of said side edge to a point of support in substantial alinement with the point of support of the lower end of the adjacent side edge of the first section, thereafter connecting the upper portion of the opposite side edge of said second section to said connecting element at the top of the pole, guying the lower portion of said opposite side edge to a point of support, thereafter installing progressively additional sections of said tent in the manner of said second section until the required number of sections have been connected at each side edge to said connecting element at the top of the pole and to a point of support at the lower end, respectively, thereafter connecting the opposite edge of the first-named section to the connecting element at the top of the pole and in overlapping relation to the adjacent edge of the last-installed section, guying the lower portion of said edge to a point of support in substantial alinement with the point of support of the lower end of the last-installed section, and securing the outer edges of ground sheets to the lower wall margins of each section.

3. A method of assembling a multi-section tent, which comprises the steps of erecting a center pole having an elongated pin, fastening the upper portion of one side edge of one tent section over said pin, guying the lower portion of said edge at a point spaced from the ground to a point of support on the ground, thereafter installing additional sections with their edges in overlapping relation to the adjacent edges of the preceding sections progressively, anchoring the same in like manner to said first-mentioned edge, finally placing the opposite edge of the first-named section over the adjacent edge of the last-installed section, and guying the same to a point of support on the ground from a point in spaced relation to the ground.

4. A method of assembling a multi-section tent, which comprises the steps of erecting a center pole having an elongated pin, fastening the upper portion of one side edge of one tent section over said pin, guying the lower portion of said edge at a point spaced from the ground to a point of support on the ground, thereafter installing additional sections with their edges in overlapping relation to the adjacent edges of the preceding sections progressively, anchoring the same in like manner to said first-mentioned edge, securing said overlapping edges to the underlying edges at spaced points along their length, finally placing the opposite edge of the first-named section over the adjacent edge of the last-installed section, guying the same to a point of support on the ground from a point in spaced relation to the ground, and securing said overlapping edge to the underlying edge at spaced points along their lengths.

5. A method of assembling a multi-section tent, which comprises the steps of erecting a center pole having an elongated pin, fastening the upper portion of one side edge of one tent section over said pin, guying the lower portion of said edge at a point spaced from the ground to a point of support on the ground, thereafter installing additional sections with their edges in overlapping relation to the adjacent edges of the preceding sections progressively, anchoring the same in like manner to said first-mentioned edge, placing the opposite edge of the first named section over the adjacent edge of the last-installed section, guying the same to a point of support on the ground from a point in spaced relation to the ground, and thereafter securing the adjacent edges of the lowermost sections to each other below their lower point of support.

6. A method of assembling a multi-section tent, which comprises the steps of erecting a center pole having an elongated pin, fastening the upper portion of one side edge of one tent section over said pin, guying the lower portion of said edge at a point spaced from the ground to a point of support on the ground, thereafter installing additional sections with their edges in overlapping relation to the adjacent edges of the preceding sections progressively, anchoring the same in like manner to said first-mentioned edge, independently guying the lower edge in substantial alinement with the underlying edge of the preceding section, finally placing the opposite edge of the first-named section over the adjacent edge of the last-installed section, guying the same to a point of support on the ground from a point in spaced relation to the ground, and thereafter releasing the guy attachement of one of the edges at the lower portion of the meeting line of the overlapping edges and folding the adjacent portion of the tent section upon itself to provide an entrance area.

7. A method of assembling a multi-section tent, which comprises the steps of erecting a center pole having an elongated pin, fastening the upper portion of one side edge of one tent section over said pin, guying the lower portion of said edge at a point spaced from the ground to a point of support on the ground, thereafter installing additional sections with their edges in overlapping relation to the adjacent edges of the preceding sections progressively, anchoring the same in like manner to said first-mentioned edge, independently guying the lower edge in substantial alinement with the underlying edge of the preceding section, finally placing the opposite edge of the first named section over the adjacent edge of the last-installed section, guying the same to a point of support on the ground from a point in spaced relation to the ground, thereafter removing one of the alined guy ropes at the meeting point of a pair of overlapping edges, and folding the adjacent portion of the tent section upon itself to provide an entrance area.

8. A structure of the character described, having in combination a center pole provided with an elongated pin at its upper end, a plurality of substantially triangular fabric units, and reinforcing fabric strips connected respectively to the side portions of said units and angularly projecting beyond the upper ends thereof to provide apertured extension tabs for engagement over said pin progressively.

9. A structure of the character described, having in combination a center pole provided with an elongated pin at its upper end, a plurality of substantially triangular fabric units, reinforcing fabric strips connected respectively to the side portions of said units and angularly projecting beyond the upper ends thereof to provide apertured extension tabs for engagement over said pin progressively, and means adjacent the lower portion of said reinforcing strips for anchoring said units to the ground.

10. A structure of the character described, having in combination a center pole provided with an elongated pin at its upper end, a plurality of substantially triangular fabric units, reinforcing fabric strips connected respectively to the side portions of said units and angularly projecting beyond the upper ends thereof to provide apertured extension tabs for engagement over said pin progressively, means adjacent the lower portion of said reinforcing strips for anchoring said units to the ground, and means along the lower margin of each unit for connection with a floor sheet.

11. A structure of the character described, having in combination a center pole provided with an elongated pin at its upper end, a plurality of substantially triangular fabric units having shallow rectangular areas with parallel side edges adjacent the bottom and having reinforcing strips connected to the inclined side edges of the triangular units and extending from the upper ends of said parallel side edges in converging relation to each other and terminating in apertured extension tabs adapted to engage said pin, guy rope loops secured adjacent the lower ends of said reinforcing strips, and pin and socket separable fasteners secured at spaced intervals to said respective reinforcing strips.

12. A structure of the character described, having in combination a center pole provided with an elongated pin at its upper end, a plurality of substantially triangular fabric units having shallow rectangular areas with parallel side edges adjacent the bottom and having reinforcing strips connected to the inclined side edges of the triangular units and extending from the upper ends of said parallel side edges in converging relation to each other and terminating in apertured extension tabs adapted to engage said pin, guy rope loops secured adjacent the lower ends of said reinforcing strips, pin and socket separable fasteners secured at spaced intervals to said respective reinforcing strips, a plurality of ground sheets having at least one edge provided with separable fastener elements, and separable fastener elements on the lower edge of said triangular fabric units for interengagement with said separable fastener elements of said ground sheets.

13. A structure of the character described, having in combination a center pole provided with an elongated pin at its upper end, a plurality of substantially triangular fabric units having shallow rectangular areas with parallel side edges adjacent the bottom and having reinforcing strips connected to the inclined side edges of the triangular units and extending from the upper ends of said parallel side edges in converging relation to each other and terminating in apertured extension tabs adapted to engage said pin, guy rope loops secured adjacent the lower ends of said reinforcing strips, and pin and socket separable fasteners secured at spaced intervals to said respective reinforcing strips, and pin and socket separable fastener elements secured to said shallow parallel side edges, respectively, in parallel side edges being movable independently of said inclined side edges.

14. A structure of the character described, having in combination a center pole provided with an elongated pin at its upper end, a plurality of substantially trianular fabric units, reinforcing fabric strips connected respectively to the side portions of said units and angularly projecting beyond the upper ends thereof to provide apertured extension tabs for engagement over said pin progressively, a reinforced central seam intermediate said reinforcing strips, and a guy rope loop secured to said seam in spaced relation to the bottom of said fabric sheet.

LAWRENCE R. ROBINSON.

CERTIFICATE OF CORRECTION.

Patent No. 2,114,061.　　　　　　　　　　　April 12, 1938.

LAWRENCE R. ROBINSON.

It is hereby certified that error appears in the printed specification of the above numbered patent requiring correction as follows: Page 5, first column, line 17, claim 6, for "attachement" read attachment; and second column, line 56, claim 13, for "in" read the; line 62, claim 14, for "trianular" read triangular; and that the said Letters Patent should be read with these corrections therein that the same may conform to the record of the case in the Patent Office.

Signed and sealed this 28th day of June, A. D. 1938.

Henry Van Arsdale,
Acting Commissioner of Patents.

(Seal)